Patented July 7, 1936

2,046,499

UNITED STATES PATENT OFFICE 2,046,499

REGENERATIVE TREATMENT OF RUBBER

Bruno Gisleno Calise, Paris, France

No Drawing. Application March 21, 1935, Serial No. 12,259. In France November 12, 1934

3 Claims. (Cl. 18—52)

The present invention relates to the treatment of rubber, and more particularly to the regeneration and direct utilization of vulcanized rubber scrap and old rubber.

According to the invention, the vulcanized rubber scrap and old rubber are subjected directly, on the cylinder mixing device or in the mixer, to the action of an addition in suitable proportions (5 to 10%) of a sulphuretted addition compound of terpenes. Sufficient plasticity and tenacity can thus be restored to the vulcanized rubber to enable it to be drawn into sheets or into strips.

The invention also includes a process for the preparation of a sulphuretted addition compound of terpenes, according to which the terpene products are reacted, by application of heat, with sulphur.

The invention further includes a product for the treatment of rubber, consisting in the sulphuretted addition compound of terpenes obtained by the last mentioned process.

The moulding and vulcanization of the mixtures treated in accordance with the invention, are effected under the same conditions as those of the current mixtures containing pure rubber (crepe rubber or smoked sheets) and the mechanical characteristics obtained are at least equal to (very often greater than) those of the rubbers of which the scrap was composed; on the other hand the resistance to ageing is perfect.

These mixtures containing solely scrap are miscible in any proportions with the current mixtures made from fresh rubber, thereby ensuring the advantages of increased strength and plasticity of the drawn sheet or of the strip before vulcanization.

The products serving for the regeneration described above are sulphuretted addition compounds of the terpenes $C_{10}H_{16}$, $C_{15}$, $H_{24}$, contained in vegetable resins, chiefly those of the Terabinthaceae family, the most important constituent of which is pinene $C_{10}H_{16}$.

Practically and under the best economical conditions these sulphuretted addition products which are more or less polymerized are obtained, without any catalysis, by the direct action of sulphur on a mixture of colophane and turpentine at a temperature of about 165° C.

The relative proportions of these three bodies which are to be reacted can be essentially variable according to the quality of the rubber scrap to be regenerated and according to the final product to be obtained, but in general the best results are obtained with the following proportions:

| | Grams |
|---|---|
| Colophane | 100 |
| Sulphur | 20 |
| Turpentine | 50 |

Here is an example of preparation of the regenerating product according to the invention.

Example 1

| | Grams |
|---|---|
| Colophane | 100 |
| Sulphur | 20 |
| Turpentine | 50 | are placed in a receptacle, said receptacle being in communication with the atmosphere through a reflux system and heated to 165° C. until complete reaction takes place, which requires about 15 to 20 minutes. It is allowed to cool, and the product then acquires at the room temperature, a gelatinous, viscous and adherent consistency.

For use, said product is heated to about 40 to 50° C. so as to impart to it a fluidity equivalent to that of ordinary mineral oil and it is mixed, in the proportions mentioned above, to the rubber to be regenerated, in the powdered state, which is then treated in the usual manner (mixer and vulcanizing). Any other additions current in the rubber industry, such as plastifiers, accelerators, anti-oxidants etc. can be made at this stage of the manufacture. For example, to manufacture ebonite, the required proportion of sulphur is added.

Example 2

100 grs. of colophane and 20 grs. of sulphur are reacted together in an open receptacle as in Example 1. The product obtained is dissolved in 50 grs. of turpentine at boiling point, and the process is then continued as above.

In certain cases the three constituents: colophane, sulphur and turpentine, could also be reacted together during the actual vulcanizing operation. The product according to the invention can also be utilized in the manufacture of agglomerates, and in particular of agglomerates containing rubber.

The invention has been described herein in a purely explanatory but non-limitative manner, and it is obvious that various modifications could be made therein without departing from the scope of the claims.

I claim:

1. A process for the regeneration of solid scrap vulcanized rubber which comprises subjecting the rubber to the action of a sulphuretted addition compound of terpenes formed by reacting together, under the action of heat, colophane, sulphur and turpentine.

2. A process for the regeneration of solid scrap vulcanized rubber which comprises subjecting the rubber to the action of a sulphuretted addition compound of terpenes formed by reacting together, at a temperature of about 165°, colophane, sulphur and turpentine.

3. A process of regenerating vulcanized solid scrap rubber which comprises treating the rubber with a solution of the product resulting from the reaction between colophane and sulphur under the action of heat in turpentine.

BRUNO GISLENO CALISE.